(12) United States Patent
Jhang et al.

(10) Patent No.: US 12,133,568 B2
(45) Date of Patent: Nov. 5, 2024

(54) INTELLIGENT HELMET DEVICE AND METHOD OF OPERATING THE SAME

(71) Applicant: THE INDUSTRY & ACADEMIC COOPERATION IN CHUNGNAM NATIONAL UNIVERSITY (IAC), Daejeon (KR)

(72) Inventors: Kyoungson Jhang, Sejong-si (KR); Gayeon Kim, Daegu (KR); Yugyeom Kim, Gyeonggi-do (KR); Jaeheon Jeong, Daejeon (KR); Sangjun Moon, Daejeon (KR); Chaeun Mun, Daejeon (KR); Dasom Choi, Chungcheongnam-do (KR); Gwanghee Lee, Daejeon (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 57 days.

(21) Appl. No.: 18/159,704

(22) Filed: Jan. 26, 2023

(65) Prior Publication Data
US 2023/0337776 A1    Oct. 26, 2023

(30) Foreign Application Priority Data
Apr. 25, 2022  (KR) .................. 10-2022-0050920

(51) Int. Cl.
*A42B 3/04*     (2006.01)
*G02B 27/64*    (2006.01)
*G06F 3/01*     (2006.01)
*G06T 7/11*     (2017.01)
(Continued)

(52) U.S. Cl.
CPC .......... *A42B 3/0433* (2013.01); *G02B 27/646* (2013.01); *G06F 3/011* (2013.01);
(Continued)

(58) Field of Classification Search
CPC .......... A42B 3/0433; G06T 7/50; G06T 7/11; G06T 2207/20021; G06V 20/70;
(Continued)

(56) References Cited

U.S. PATENT DOCUMENTS

| 9,445,639 B1 * | 9/2016 | Aloumanis | ............ G06F 3/147 |
| 10,219,571 B1 * | 3/2019 | Aloumanis | ............ G08G 1/167 |

(Continued)

FOREIGN PATENT DOCUMENTS

| KR | 10-2020-0096122 A | 8/2020 |
| KR | 10-2020-0101544 A | 8/2020 |

(Continued)

OTHER PUBLICATIONS

Office Action dated Aug. 21, 2021 for corresponding Korean Patent Application No. 10-2022-0050920 and English translation.

*Primary Examiner* — Thomas D Alunkal
(74) *Attorney, Agent, or Firm* — Pearne & Gordon LLP

(57) ABSTRACT

According to various embodiments, a helmet device includes a communication module, a sensor module, a camera module, and a processor, wherein the processor is set to determine whether a user wears the helmet device using the sensor module, when it is determined that the user wears the helmet device, transmit a first transmission signal indicating that the user wears the helmet device to a user device interworking with the helmet device through the communication module, upon receiving a first response signal for the first transmission signal from the user device through the communication module, activate the camera module and then determine whether an external object approaches based on an image acquired through the camera module, and in response to the approach of the object, provide a notification to the user. Various other embodiments are also possible.

20 Claims, 12 Drawing Sheets

(51) Int. Cl.
*G06T 7/50* (2017.01)
*G06V 10/26* (2022.01)
*G06V 10/70* (2022.01)
*G06V 20/50* (2022.01)
*G06V 20/70* (2022.01)
*G08B 5/36* (2006.01)
*G08B 21/02* (2006.01)

(52) U.S. Cl.
CPC ............... *G06T 7/11* (2017.01); *G06T 7/50* (2017.01); *G06V 10/26* (2022.01); *G06V 10/70* (2022.01); *G06V 20/50* (2022.01); *G06V 20/70* (2022.01); *G08B 5/36* (2013.01); *G08B 21/02* (2013.01); *G06T 2207/20021* (2013.01)

(58) Field of Classification Search
CPC ........ G06V 10/70; G06V 10/26; G06V 20/50; G02B 27/646; G06F 3/011; G08B 5/36; G08B 21/02
See application file for complete search history.

(56) References Cited

U.S. PATENT DOCUMENTS

| | | | |
|---|---|---|---|
| 2016/0144773 A1* | 5/2016 | Alataas | B60Q 1/44 340/475 |
| 2016/0355126 A1* | 12/2016 | Anderson | A42B 3/0453 |
| 2017/0119078 A1* | 5/2017 | Chen | F21V 23/0407 |
| 2017/0131762 A1* | 5/2017 | Liang | H04N 7/181 |
| 2017/0139212 A1* | 5/2017 | Choi | G06F 1/163 |
| 2020/0298925 A1* | 9/2020 | Viner | A42B 3/0466 |
| 2021/0195981 A1* | 7/2021 | Ghaffarzadegan | B60W 50/0098 |

FOREIGN PATENT DOCUMENTS

| | | |
|---|---|---|
| KR | 10-2021-0079525 A | 6/2021 |
| KR | 10-2253543 B1 | 6/2021 |
| KR | 10-2271321 B1 | 7/2021 |

* cited by examiner

801

802

803

INTELLIGENT HELMET DEVICE AND METHOD OF OPERATING THE SAME

CROSS-REFERENCE TO RELATED APPLICATION

This application claims priority to and the benefit of Korean Patent Application No. 10-2022-0050920, filed on Apr. 25, 2022, the disclosure of which is incorporated herein by reference in its entirety.

BACKGROUND

1. Field

The present invention relates to an intelligent helmet device and a method of operating the same, and more particularly, to an intelligent helmet device for protecting a user when the user who wears an intelligent helmet device operates a personal mobility device.

2. Description of Related Art

Recently, as short-distance mobility devices, an interest in personal mobility devices (for example, electric scooters), which are mobility devices which receive electric power using a rechargeable battery and use the electric power as power without using fossil fuel, is increasing. In addition, the personal mobility device is easy to operate and does not require a separate license and thus has an advantage in that many people can conveniently use the personal mobility device.

Due to such convenience, the rental business of personal mobility devices as well as cases of personal mobility devices purchased and owned by individuals for hobbies has recently been rapidly growing and also are widely used as devices for commuting. Thus, the market related to personal mobility devices is growing considerably.

However, as the use of convenient personal mobility devices increases, safety problems also arise. Personal mobility devices are prohibited from being boarded on a sidewalk, are allowed to be boarded only on a roadway on which a car travels, and are allowed to travel at an average speed of around 25 km/h. Some personal mobility devices may speed up to 65 km/h and have a risk of collision with various mobility devices such as cars or motorcycles.

In addition, in order to overcome such problems in advance, it is essential for a driver to wear protective equipment for the safety, especially a helmet, when the driver rides an electric scooter. However, most drivers do not wear helmets and ride electric scooters, resulting in great damage in case of accident.

In addition, in the above problem, when not only mobility devices such as cars and motorcycles but also objects that interfere with traveling approach, or a user does not recognize objects that interfere with traveling, there is a risk of collision with the above objects.

SUMMARY

The present invention is directed to providing an intelligent helmet device for preventing an accident of a user of a personal mobility device who wears a helmet device, and a method of operating the same.

According to an aspect of the present invention, there is provided a helmet device including a communication module, a sensor module, a camera module, and a processor, wherein the processor is set to determine whether a user wears the helmet device using the sensor module, when it is determined that the user wears the helmet device, transmit a first transmission signal indicating that the user wears the helmet device to a user device interworking with the helmet device through the communication module, upon receiving a first response signal for the first transmission signal from the user device through the communication module, activate the camera module and then determine whether an object approaches from the outside based on an image acquired through the camera module, and in response to the approach of the object, provide a notification to the user.

According to another aspect of the present invention, there is provided A method of operating a helmet device including determining whether a user wears the helmet device using a sensor module of the helmet device, when it is determined that the user wears the helmet device, transmitting a first transmission signal indicating that the user wears the helmet device to a user device interworking with the helmet device through a communication module of the helmet device, upon receiving a first response signal for the first transmission signal from the user device through the communication module, activating a camera module of the helmet device and then determining whether an object approaches from the outside based on an image acquired through the camera module, and in response to the approach of the object, providing a notification to the user.

DETAILED DESCRIPTION OF EXEMPLARY EMBODIMENTS

Figure 1:
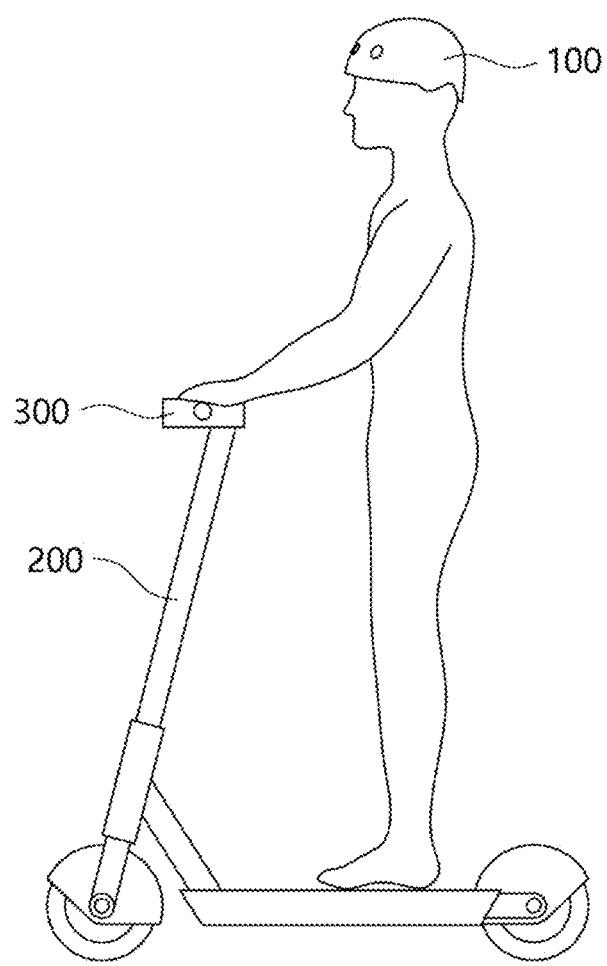
FIG. 1 is a diagram illustrating an operating mode according to various embodiments.

Hereinafter, various embodiments of the present document will be described with reference to the accompanying drawings. The embodiments and the terms used therein are not intended to limit the technology disclosed herein to specific forms and should be understood to include various modifications, equivalents, and/or alternatives to the corresponding embodiments. In describing the drawings, similar reference numerals may be used to designate similar components. A singular expression may include a plural expression unless they are definitely different in a context. In this document, the expressions "A or B," "at least one of A and/or B," and the like may include all possible combinations of the items listed together. The expression "a first," "a second," "the first," or "the second" may indicate various components regardless of the order and/or the importance, is used for distinguishing a component from another component, and does not limit corresponding components. When a component (for example, a first component) is referred to as being "(functionally or communicatively) connected," or "directly coupled" to another component (second component), the component may be connected directly to another component or connected to another component through still another component (for example, a third component).

The expression "configured to (or set to)" used in this document may be interchangeably used with, for example, "suitable for," "having the capacity to," "changed to," "made to," "capable of," or "designed to" in terms of hardware or software, according to circumstances. In some situations, the expression "device configured to" may mean that the device is "capable of" being configured together with another device or component. For example, the phase "a processor configured (or set) to perform A, B, and C" may mean a general purpose processor (for example, a central processing unit (CPU) or an application processor) capable of performing the corresponding operations by executing one or more software programs stored in a memory device or a dedicated processor (for example, an embedded processor) capable of performing the corresponding operation.

FIG. 1 is a diagram illustrating an operating mode according to various embodiments.

Referring to FIG. 1, a helmet device 100 of the present invention may control a personal mobility device 200 through a communication device and may communicate with the user device 300.

The helmet device 100 according to various embodiments of the present document is a generally used helmet and prevents an accident from occurring when a user moves while riding the personal mobility device 200. To this end, it is preferable that the helmet device 100 be formed in a structure which is generally made of plastic, allows a user to comfortably wear the helmet device 100, and is able to reduce a weight burden on the user. In addition, it is preferable that a space be formed inside the helmet device 100 such that a plurality of electronic devices are provided therein. In addition, a strap (undrawn) is connected to each of lower left and right sides to be worn below a user's face so that the helmet device 100 is not detached externally when the user wears the helmet device 100.

The personal mobility device 200 according to various embodiments of the present invention is a mobility device that moves by means of electricity, such as an electric scooter, a segway, or an electric bicycle which is generally used and allows only one person to ride and move. As an example, since the personal mobility device 200 of the present invention moves through an electric motor, the personal mobility device 200 is small and moves at a high speed and, under the current Korean law, only when a user wears the helmet device 100, the user can drive the personal mobility device 200. A method thereof will be described below in detail.

The user device 300 according to various embodiments of the present document may include, for example, at least one of a smartphone, a tablet personal computer (PC), a mobile phone, an image phone, an e-book reader, a desktop PC, a laptop PC, a netbook computer, a workstation, a personal digital assistant (PDA), a portable multimedia player (PMP), an MP3 player, a medical device, a camera, and a wearable device. The wearable device may include at least one of an accessory type device (for example, a watch, ring, bracelet, ankle bracelet, necklace, glasses, or contact lens type device, or a head-mounted-device (HMD)), a fabric or cloth-integrated device (for example, an electronic garment), a body-attached device (for example, a skin pad or tattoo), and a biologically-implantable circuit. In various embodiments, the user device 300 may be flexible or a combination of two or more of the above-described various devices. The user device 300 according to the embodiment of the present document is not limited to the above-described devices. In the present document, the term "user" may refer to a person using the user device 300 or a device (for example, an artificial intelligence electronic device) using the user device 300. Also, the user device 300 performs communication. The helmet device 100 may be connected to a network (not shown) through wireless or wired communication to communicate with the user device 300. The wireless communication may include cellular communication using at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like. According to one embodiment, the wireless communication may include, for example, at least one of wireless fidelity (WiFi), Bluetooth (BT), BT low energy (BLE), ZigBee, near field communication (NFC), magnetic secure transmission, radio frequency, or body area network (BAN). According to one embodiment, the wireless communication may include a global navigation satellite system (GNSS). The GNSS may include, for example, a global positioning system (GPS), a global navigation satellite system (Glonass), a BeiDou navigation satellite system (hereinafter referred to as "BeiDou") or Galileo, or the European global satellite-based navigation system. Hereinafter, in the present document, "GPS" may be used interchangeably with "GNSS." The wired communication may include, for example, at least one of a universal serial bus (USB), a high-definition multimedia interface (HDMI), a recommended standard-232 (RS-232), power line communication, a plain old telephone service (POTS), or the like. This is to enable the user device 300 to communicate with an external device, unlike functions of a communication module 110 and a second communication module 210, thereby establishing long-distance communication.

Figure 2:
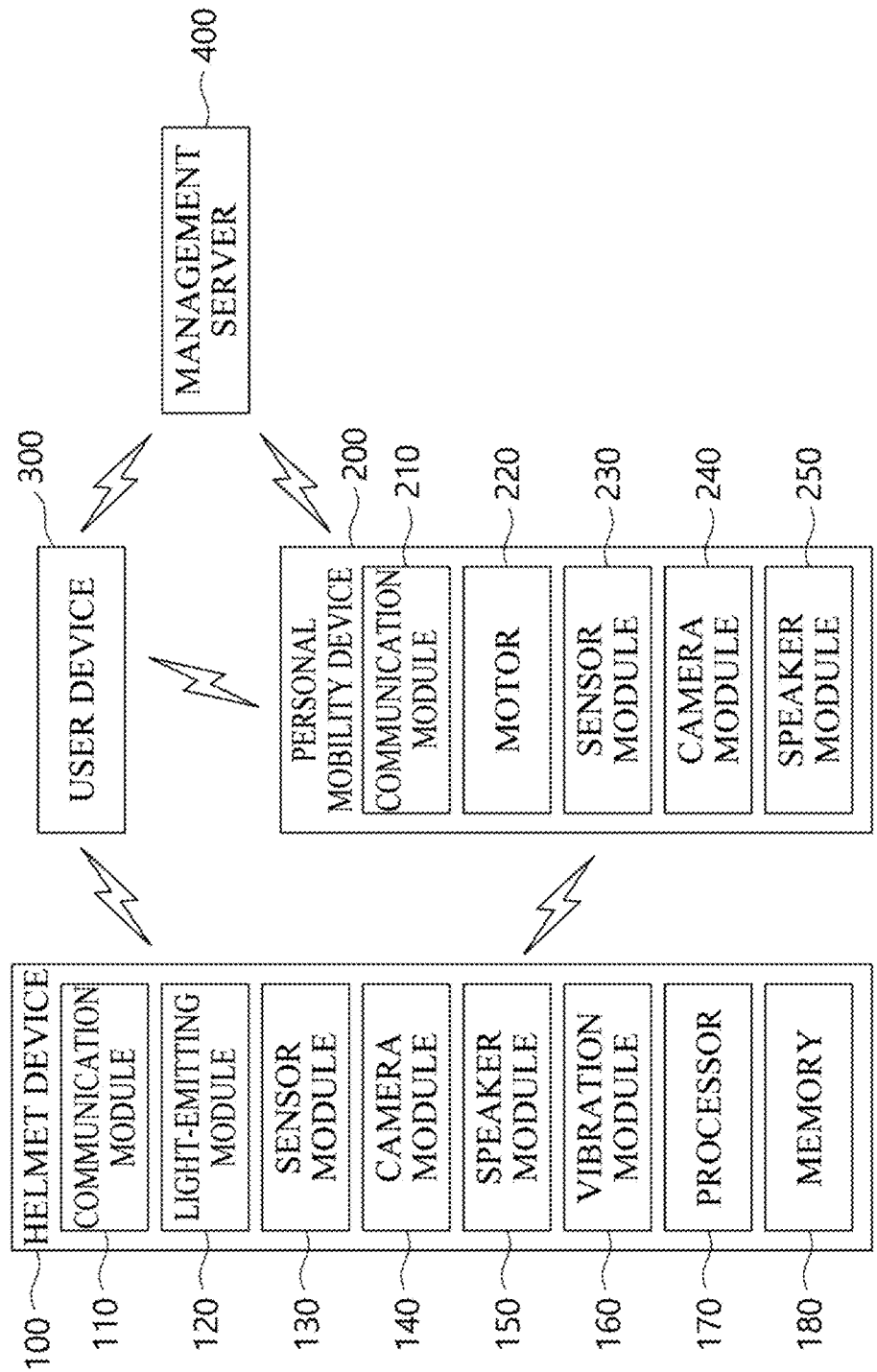
FIG. 2 is a block diagram of an electronic device in a network environment according to various embodiments.
Figure 3:
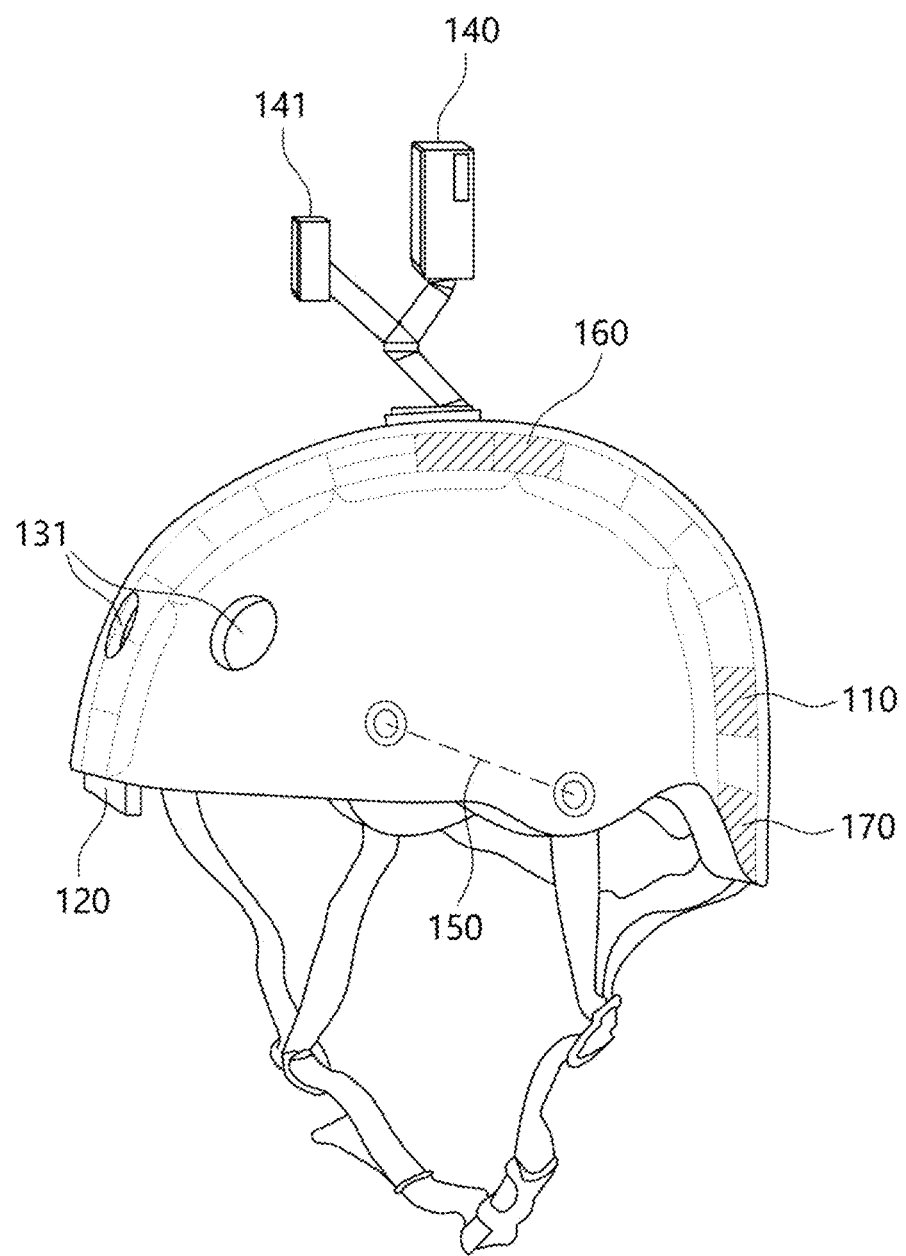
FIG. 3 is a configuration diagram of a helmet device according to various embodiments.

FIG. 2 is a block diagram of an electronic device in a network environment according to various embodiments. FIG. 3 is a configuration diagram of a helmet device according to various embodiments.

According to an example of the present document, a helmet device 100 includes a communication module 110, a light-emitting module 120, a sensor module 130, a camera module 140, a speaker module 150, a vibration module 160, a processor 170, and a memory 180.

In addition, a personal mobility device 200 includes a communication module 210, a motor 220, a sensor module 230, a camera module 240, and a speaker module 250.

The communication module 110 may generate an electrical signal or signal for a data value (for example, a radio frequency (RF) signal) for the helmet device 100 to transmit the electrical signal or RF signal to a user device communication module 310. According to one embodiment, the communication module 110 and the user device communication module 310 are based on short-range communication. In addition, the short-range communication may be performed based on Bluetooth-related standards. In addition, in the short-range communication, according to Bluetooth standards, a 2.45-GHz RF signal may be transmitted or received within a short distance of around 10 m (up to 100 m). In embodiments of the present invention, a short-range communication technology based on Bluetooth is used. However, the present invention is not limited thereto, and the short-range communication technology may include any one technology of radio frequency identification (RFID), infrared data association (IrDA), ultra-wideband (UWB), ZigBee, wireless fidelity (Wi-Fi), and near field communication (NFC). In addition, the communication module 110 is preferably installed inside the helmet device 100, and although an example in which the communication module 110 is installed at an inner rear side of the helmet device 100 (see FIG. 3) is shown, but an installation position thereof is not limited.

The light-emitting module 120 is a generally used light-emitting device such as an light-emitting diode (LED) module or a small light bulb and is preferably installed in a small size and installed in the front of the helmet device 100 (see FIG. 3). In addition, the light-emitting module 120 differentiates a color and intensity of light when the personal mobility device 200 is driven to move forward with those of light for warning approach of an object, thereby allowing a user to easily check a warning.

The sensor module 130 may detect whether a user wears the helmet device 100 and may generate corresponding electrical signals and data values in a detected state. According to one embodiment, the sensor module 130 may include various sensors capable of detecting whether a user wears the helmet device 100, such as a photosensitive sensor, a pressure sensor, a gesture sensor, a magnetic sensor, and a temperature sensor. As an example, when a user wears the helmet device 100, the sensor module 130 detects a change in light intensity, gesture, magnetism, or temperature in a state in which the user wears the helmet device 100 and provides information about the change to the processor 170. In addition, the sensor module 130 is preferably installed inside the helmet device 100, and although an example in which the sensor module 130 is installed at an inner front side of the helmet device 100 (see FIG. 3) is shown, but an installation position thereof is not limited.

The camera module 140 may be installed on an upper end of the helmet device 100 and may be installed on a side surface or a front surface, and an installation position thereof is not limited. According to one embodiment, the camera module 140 may include various visual sensors capable of photographing a front view of the helmet device 100 using visible light, infrared light, or the like. As an example, when a user moves in the personal mobility device 200, the camera module 140 photographs the front view of the helmet device 100 and provides an image of the front view to the processor 170. In addition, a pair of mirrors 141 and 142 are installed in front of a support (undrawn) of the camera module 140 to photograph a left view and a lateral view. As will be described below, the pair of mirrors 141 and 142 allow a user to check objects ahead and objects approaching in a lateral direction and cope with the objects.

The speaker module 150 is a generally used speaker, is preferably installed in a small size, and stimulates the ears of a user but emits sound waves that do not damage the ears. In addition, the speaker module 150 is installed at portions close to each of the ears of a user inside the helmet device 100 (see FIG. 3) to allow the user to easily perceive a warning sound.

The vibration module 160 is a generally used vibrator, is preferably installed in a small size, and vibrates the helmet device 100 to not cause inconvenience to a user. In addition, the vibration module 160 is preferably provided to adjust intensity of vibrations through a switch (not shown) in the helmet device 100 of a user. In addition, the vibration module 160 may adjust intensity of vibrations through the user device 300. In addition, the vibration module 160 is preferably installed inside the helmet device 100, and although an example in which the vibration module 160 is installed at an inner upper side of the helmet device 100 (see FIG. 3) is shown, but an installation position thereof is not limited.

The processor 170 controls operations of the communication module 110, the light-emitting module 120, the sensor module 130, the camera module 140, the speaker module 150, and the vibration module 160 installed in the helmet device 100 and controls the sensor module 230, the second camera module 240, a speaker module 250, a load cell 260, a gravity detection module 270 installed in the personal mobility device 200. As an example, the processor 170 participates in the overall operation of the communication module 110 and drives electronic devices of the personal mobility device 200 through the communication module 110 to transmit signals to a plurality of devices installed in the user device 300. As another example, the processor 170 may include any type of device capable of processing data. In addition, the processor 170 is preferably installed inside the helmet device 100, and although an example in which the processor 170 is installed at the inner rear side of the helmet device 100 (see FIG. 3) is shown, but an installation position thereof is not limited.

The memory 180 is a device that stores information of the processor 170 installed in the helmet device 100. As an example, memory 180 may include volatile and/or non-volatile memory. The memory 180 may store, for example, commands or data related to at least one other component of a management server 400. According to one embodiment, the memory 180 may store software and/or programs. The programs may include, for example, a kernel, middleware, an application programming interface (API), and/or an application program (or an "application"). At least a part of the kernel, the middleware, the API may be referred to as an operating system. For example, the kernel may control or manage system resources (for example, the first processor 170 or the memory 180) used to execute operations or functions implemented in other programs (for example, the middleware, the API, or the application program). In addition, the kernel may provide an interface capable of controlling or managing the system resources by accessing individual components of the management server 400 through the middleware, the API, or the application program. The memory 180 is preferably installed inside the helmet device 100, and although an example in which the memory 180 is installed at an inner upper side of the helmet device 100 (see FIG. 3) is shown, but an installation position thereof is not limited.

The communication module 210 is installed in the personal mobility device 200, and since a function thereof is the same as that of the communication module 110, details thereof will be omitted.

The motor 220 is installed to rotate wheels of the personal mobility device 200 and move the personal mobility device 200. The motor 220 may be controlled by the processor 170 and may be driven by a user through a movement function installed on a steering handle.

The sensor module 230 is installed in the personal mobility device 200. The sensor module 230 may be provided as a heat sensor, a gyro sensor, a load cell, or a vibration sensor module, and a structure and usage method thereof are not limited. In addition, the sensor module 230 transfers each detection data to the processor 170 through the communication module.

The second camera module 240 is preferably installed in the personal mobility device 200 in a direction in which a user rides, and since a function thereof is the same as that of the camera module 140, details thereof will be omitted. In addition, the second camera module 240 transfers detected image information to the processor 170 through the communication module 210.

The management server 400 is a central system that communicates with the communication module 110 or the user device communication module 310. In some embodiments, in the management server 400, at least one of components may be omitted, or other components may be additionally provided. According to one embodiment, the management server 400 may be a server for driving an application that operates according to the present disclosure. According to another embodiment, the management server 400 may include one or more of a CPU, an application processor, and a communication processor (CP). For example, the processor 170 may perform calculations or data processing related to control and/or communication of one or more other components of the management server 400.

Figure 4:
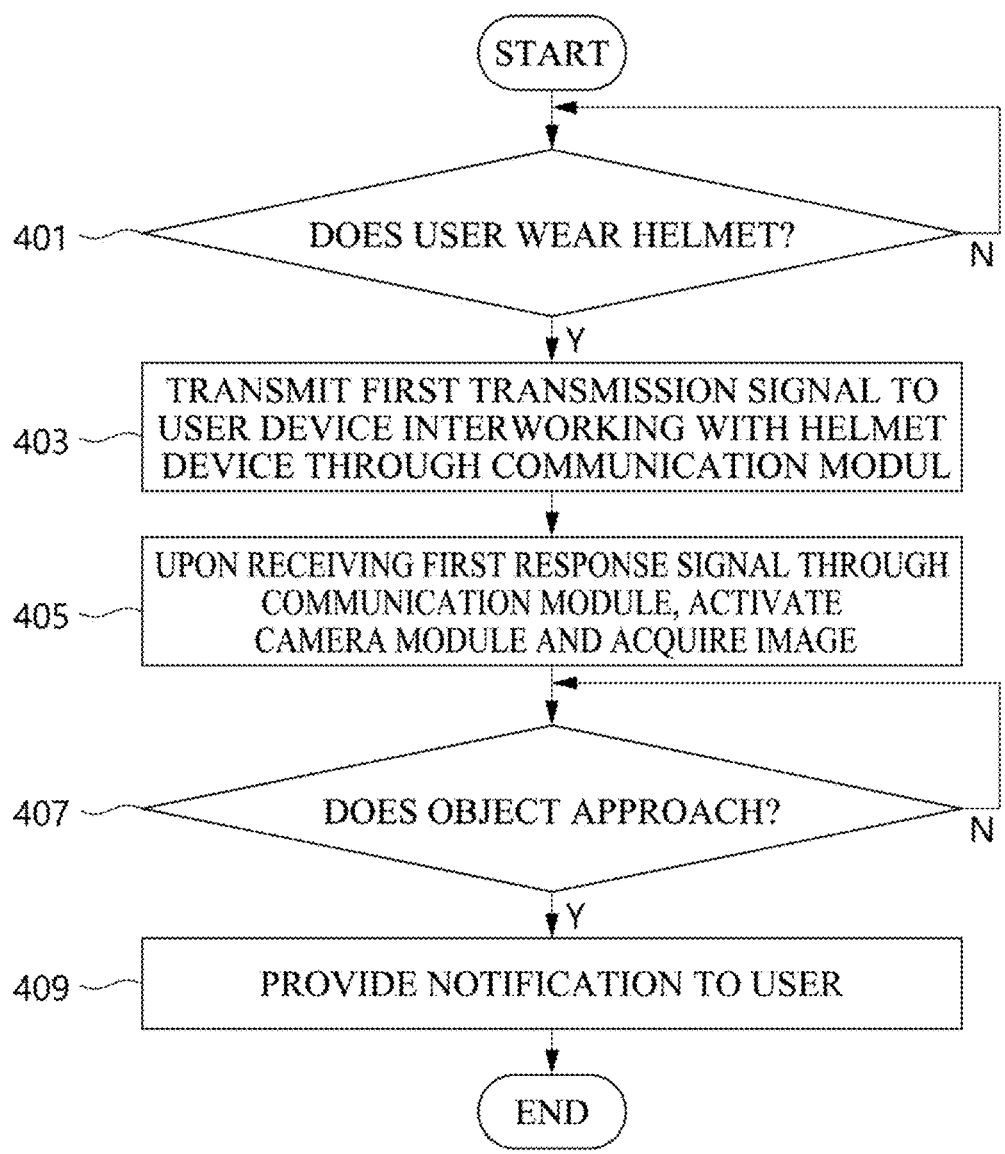
FIG. 4 is a flowchart illustrating an operation in which a helmet device provides a notification to a user based on whether an external object approaches according to various embodiments.

FIG. 4 is a flowchart illustrating an operation in which a helmet device (for example, the helmet device 100 of FIG. 2) provides a notification to a user based on whether an external object approaches according to various embodiments.

Figure 5A:
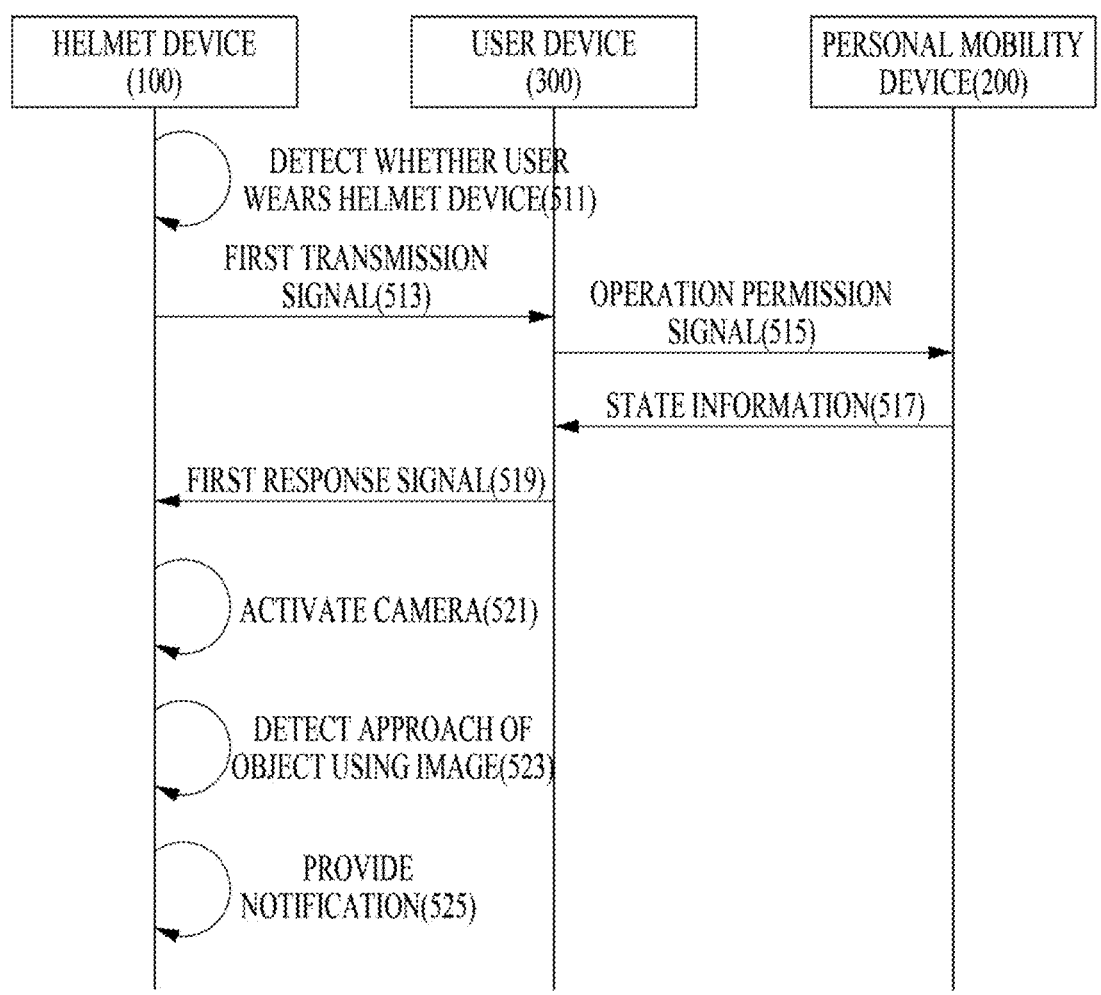
FIG. 5A is a sequence diagram for describing an operation in which a helmet device provides a notification to a user according to various embodiments.

FIG. 5A is a sequence diagram for describing an operation in which the helmet device 100 provides a notification to a user according to various embodiments.

Figure 5B:
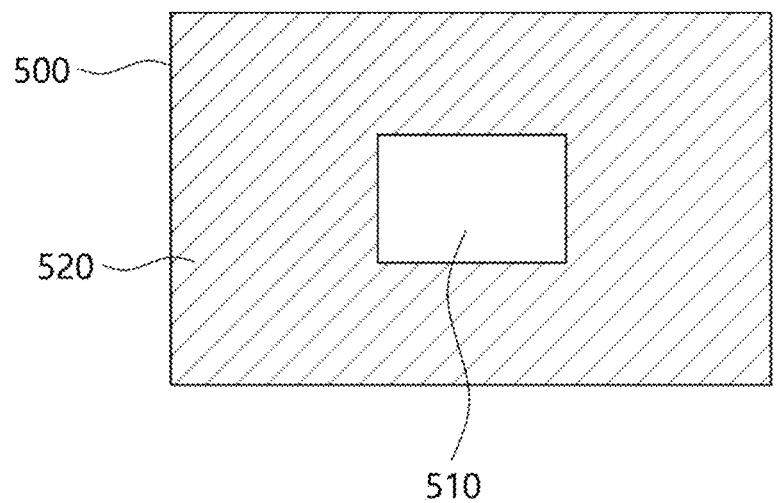
FIG. 5B is a diagram for describing a region in which the helmet device recognizes an object in an image according to various embodiments.

FIG. 5B is a diagram for describing a region in which the helmet device 100 recognizes an object in an image according to various embodiments.

Figure 5C:
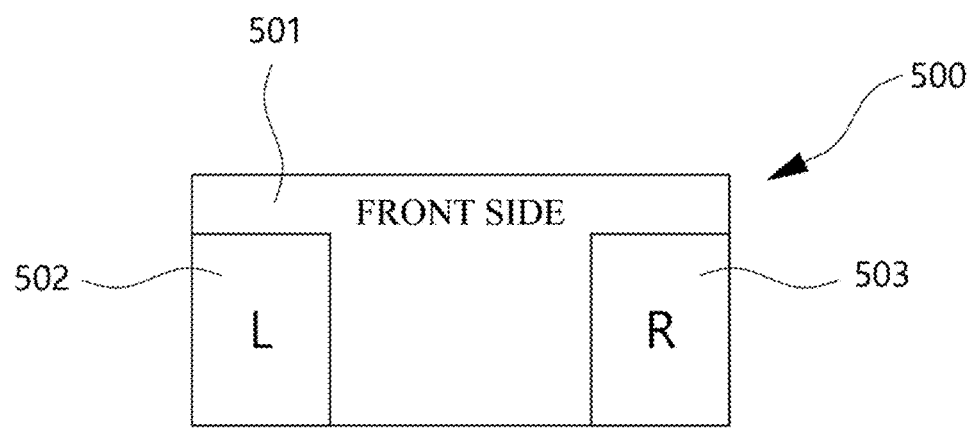
FIG. 5C is a diagram illustrating a structure of an image acquired by the helmet device and a structure of mirrors mounted on the helmet device according to various embodiments.
Figure 5D:
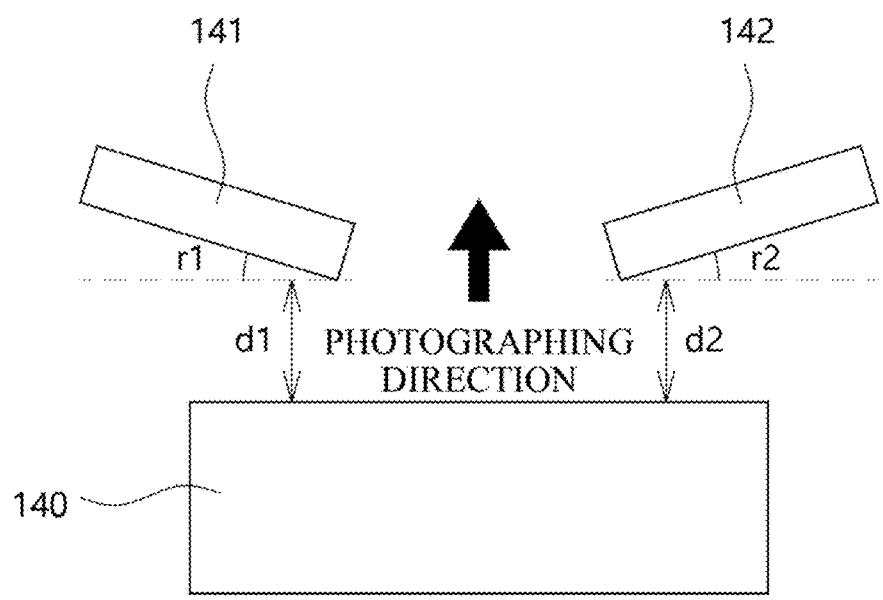
FIG. 5D is a diagram illustrating a structure of an image acquired by the helmet device and a structure of mirrors mounted on the helmet device according to various embodiments.

FIGS. 5C and 5D are a diagram illustrating a structure of an image acquired by the helmet device 100 and a structure of mirrors mounted on the helmet device 100 according to various embodiments.

Figure 6A:
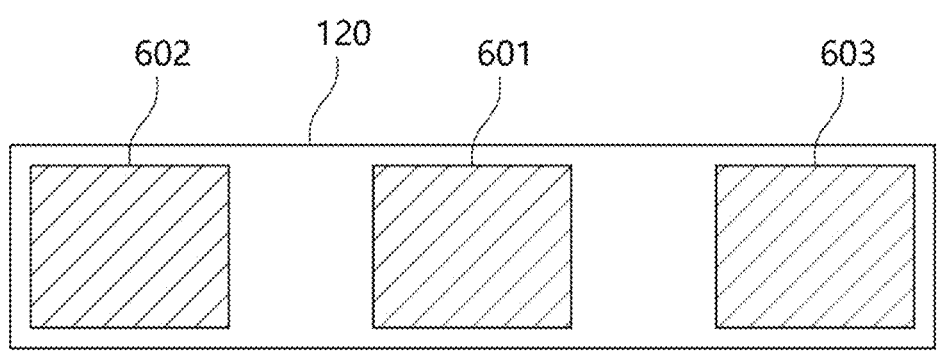
FIG. 6A is a diagram illustrating an example in which the helmet device provides a notification through a light-emitting module according to various embodiments.
Figure 6B:
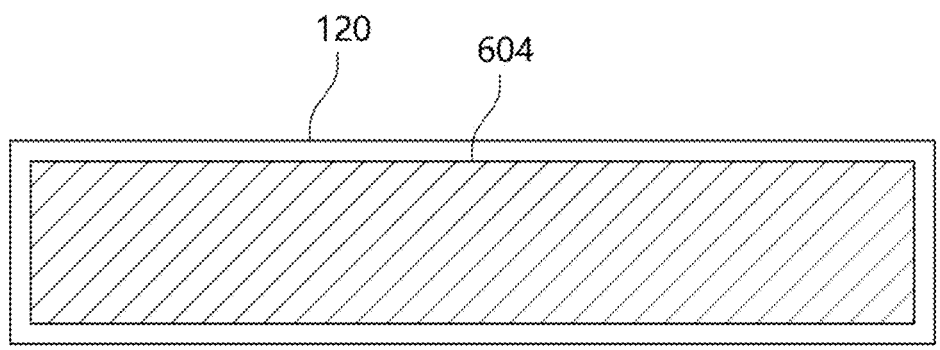
FIG. 6B is a diagram illustrating an example in which the helmet device provides a notification through a light-emitting module according to various embodiments.

FIGS. 6A and 6B are a diagram illustrating an example in which the helmet device 100 provides a notification through a light-emitting module (for example, the light-emitting module 120 of FIG. 2) according to various embodiments.

According to various embodiments, in operation 401, the helmet device 100 (for example, the processor 170 of FIG. 2) may determine whether a user wears the helmet device 100 using a sensor module (for example, the sensor module 130 of FIG. 2).

According to one embodiment, the helmet device 100 may determine that the user wears the helmet device 100 based on a sensor value that is measured by the sensor module 130 and exceeds a preset value for a preset time. According to one embodiment, the sensor module 130 may be a sensor 131 of FIG. 3 for determining whether the user wears the helmet device 100 and may include a heat sensor, a pressure sensor, or a proximity sensor. For example, when a sensor value, which is measured by the heat sensor, the pressure sensor, or the proximity sensor positioned at a point with which the forehead of the user is in contact, exceeds the preset value for the preset time (for example, 10 seconds), the helmet device 100 may determine that the user wears the helmet device 100. Specifically, when the sensor value of the heat sensor exceeds the set value due to a body temperature of the user or the sensor value of the pressure sensor or proximity sensor exceeds the set value due to a close contact between the head of the user and the helmet device, the helmet device 100 may determine that the user wears the helmet device 100. For example, referring to FIG. 5A, the helmet device 100 may detect that the user wears the helmet device 100 (511). According to one embodiment, based on a sensor value measured by the sensor module 130 being less than or equal to the predetermined value, the helmet device 100 may determine that the user does not wear the helmet device 100.

According to various embodiments, in operation 403, based on the user wearing the helmet device 100, the helmet device 100 (for example, the processor 170 of FIG. 2) may transmit a first transmission signal indicating that the user wears the helmet device 100 to a user device (for example, the user device 300 of FIG. 2) interworking with the helmet device 100 through a communication module (for example, the communication module 110 of FIG. 2). For example, referring to FIG. 5A, the helmet device 100 may transmit the first transmission signal indicating that the user wears the helmet device 100 to the user device 300 through the communication module 110 (513).

According to one embodiment, when the first transmission signal is received from the helmet device 100, the user device 300 transmits an operation permission signal for permitting the operation of a personal mobility device 200 to the personal mobility device (for example, the personal mobility device 200 of FIG. 2) interworking with helmet device 100. For example, referring to FIG. 5A, upon receiving the first transmission signal, the user device 300 may transmit the operation permission signal to the personal mobility device 200 (515). According to one embodiment, the personal mobility device 200 may transmit state information indicating a state of the personal mobility device 200 to the user device 300. For example, referring to FIG. 5A, upon receiving the operation permission signal, the personal mobility device 200 may change an operating state from an operation-disable state to an operation permission state and then transmit the state information (for example, an operation permission state) of the personal mobility device 200 to the user device 300 (517). The operation permission state may be a state in which a motor of the personal mobility device 200 (for example, the motor 220 of FIG. 1) is activated and driven so that the personal mobility device 200 is able to move. The operation-disable state may be a state in which the motor 220 of the personal mobility device 200 is deactivated so that the personal mobility device 200 is unable to move.

According to one embodiment, when the user removes (or puts off) the helmet device 100 in a state in which the user wears the helmet device 100, the helmet device 100 may transmit a second transmission signal indicating that the user does not wear the helmet device 100 to the user device 300 through the communication module 110. In this case, upon receiving the second transmission signal, the user device 300 transmits an operation-disable signal for prohibiting the operation of the personal mobility device 200 to the personal mobility device 200, thereby allowing the operating state to be changed from the operation permission state to the operation-disable state.

According to various embodiments, in operation 405, upon receiving a first response signal for the first transmission signal from the user device 300 through the communication module 110, the helmet device 100 (for example, the processor 170 of FIG. 2) activates a camera module (for example, the camera module 140 of FIG. 2) and then acquires an image through the camera module 140.

According to various embodiments, the helmet device 100 (for example, the processor 170 of FIG. 2) may receive a response signal corresponding to a state of the personal mobility device 200 from the user device 300. According to one embodiment, the helmet device 100 may receive the first response signal corresponding to the operation permission state of the personal mobility device 200 as a response (ack) to the first transmission signal from the user device 300. For example, referring to FIG. 5A, upon receiving state information (for example, an operation permission state) of the personal mobility device 200, the user device 300 may transmit the first response signal indicating the operation permission state to the helmet device 100 (519). According to one embodiment, the helmet device 100 may receive a second response signal corresponding to the operation-disable state of the personal mobility device 200 as a response to the second transmission signal from the user device 300.

According to various embodiments, upon receiving the first response signal, the helmet device 100 (for example, the processor 170 of FIG. 2) may activate the camera module 140 and then acquire an image through the activated camera module 140. For example, referring to FIG. 5A, upon receiving the first response signal (519), the helmet device 100 may activate the camera module 140 (521) and acquire an image through the camera module 140.

According to various embodiments, in operation 407, the helmet device 100 (for example, the processor 170 of FIG. 2) may determine whether an external object approaches based on the image acquired through the camera module 140. For example, referring to FIG. 5A, the helmet device 100 may detect an approach of an object using the image acquired through the activated camera module 140 (523).

According to various embodiments, the helmet device 100 (for example, the processor 170 of FIG. 2) may recognize an object from the image acquired through the camera module 140 using a deep learning-based object recognition algorithm. For example, the helmet device 100 may input the acquired image to the deep learning-based object recognition algorithm to recognize specific objects (for example, a person, a street light, a car, and the like) in the image. According to one embodiment, the object recognition algorithm includes one of a You Only Look Once (YOLO) model, a Detection TRansformer (DETR) model, a Single Shot Detector (SSD) model, a Faster R-CNN model, a Corner Net model, and a Center Net model, but the above example is merely one example. The present invention is not limited thereto, and the object recognition algorithm may include various algorithms that can be implemented by those skilled in the art.

According to one embodiment, the helmet device 100 may recognize an object in regions except for a central region corresponding to a preset range from a central point of the image in an entire region of the acquired image. For example, referring to FIG. 5B, except for a central region 510 corresponding to the preset range from the central point of an image 500 in the entire region of the image 500 acquired through the camera module 140, the helmet device 100 may recognize an object in the remaining region 520.

According to one embodiment, the image acquired through the camera module 140 may be divided into a first region for detecting an approach of a first object in a photographing direction of the camera module 140, a second region for detecting an approach of a second object in a rear-left direction of the photographing direction, and a third region for detecting an approach of a third object in a rear-right direction of the photographing direction. For example, referring to FIG. 5C, the image 500 acquired through the camera module 140 may be divided into a first region 501 for detecting an approach of the first object in the photographing direction of the camera module 140, a second region 502 for detecting an approach of the second object in the rear-left direction of the photographing direction, and a third region 503 for detecting an approach of the third object in the rear-right direction of the photographing direction. According to one embodiment, the helmet device 100 may include a first mirror spaced a first distance from the camera module 140 and tilted at a first angle with respect to the camera module 140 to display the second region 502 and a second mirror spaced a second distance from the camera module 140 and tilted at a second angle with respect to the camera module 140 to display the third region 503. For example, referring to FIG. 5D, the helmet device 100 may include a first mirror 141 spaced a first distance d1 apart from the camera module 140 and tilted at a first angle r1 with respect to the camera module 140 to display the second region 502 and a second mirror 142 spaced a second distance d2 apart from the camera module 140 and tilted at a second angle r2 with respect to the camera module 140 to display the third region 503.

According to various embodiments, the helmet device 100 (for example, the processor 170 of FIG. 2) may estimate a distance between the helmet device 100 and an object using a deep learning-based depth estimation algorithm. For example, the helmet device 100 may input an image corresponding to a region occupied by an object (for example, a bounding box) in an image to the deep learning-based depth estimation algorithm to estimate a distance to the corresponding object. According to one embodiment, the depth estimation algorithm may include one of a Deep Plane Sweep Network (DPSNet) model and a DenseDepth model, but the above example is merely one example. The present invention is not limited thereto, and the depth estimation algorithm may include various algorithms that can be implemented by those skilled in the art. According to one embodiment, the helmet device 100 may estimate the distance to the object to calculate a change in distance (for example, speed) of the object relative to the helmet device 100 according to an amount of time change.

According to one embodiment, when the estimated distance to the object is within a preset distance, the helmet device 100 may determine that the object approaches. According to one embodiment, when the estimated distance to the object is within the preset distance, and the speed of the object relative to the helmet device 100 exceeds a preset value, the helmet device 100 may determine that the object approaches.

According to various embodiments, in operation 409, in response to the approach of the external object, the helmet device 100 (for example, the processor 170 of FIG. 2) may provide a notification to the user. For example, referring to FIG. 5A, when the helmet device 100 detects the approach of the object, the helmet device 100 may provide a notification to the user (525).

According to various embodiments, in response to the approach of the object, the helmet device 100 (for example, the processor 170 of FIG. 2) may perform at least one of operation 1 of controlling a light-emitting module (for example, the light-emitting module 120 of FIG. 2) to emit light, operation 1 of controlling a speaker module (for example, the speaker module 150 of FIG. 2) to output a sound, and operation 3 of controlling a vibration module (for example, the vibration module 160 of FIG. 2) to generate vibrations.

According to one embodiment, when the helmet device 100 detects an approach of an object only in the first region 501 among the first region 501, the second region 502, and the third region 503 of the image 500, the helmet device 100 may emit light through a preset central region of the light-emitting module 120 such that the user may recognize that the object approaches in a front direction. For example, referring to FIGS. 5C and 6A, when the helmet device 100 detects an approach of an object only in the first region 501, the helmet device 100 may control the light-emitting module 120 to emit light through a preset central region 601 of the light-emitting module 120. According to one embodiment, when the helmet device 100 detects an approach of an object only in the second region 502 among the first region 501, the second region 502, and the third region 503 of the image 500, the helmet device 100 may emit light through a preset left region of the light-emitting module 120 such that the user may recognize that the object is approaching in the rear-left direction. For example, referring to FIGS. 5C and 6A, when the helmet device 100 detects an approach of an object only in the second region 502, the helmet device 100 may control the light-emitting module 120 to emit light through a preset left region 602 of the light-emitting module 120. According to one embodiment, when the helmet device 100 detects an approach of an object only in the third region 503 among the first region 501, the second region 502, and the third region 503 of the image 500, the helmet device 100 may emit light through a preset left region of the light-emitting module 120 such that the user may recognize that the object approaches in the left-rear direction. For example, referring to FIGS. 5C and 6A, when the helmet device 100 detects an approach of an object only in the third region 503, the helmet device 100 may control the light-emitting module 120 to emit light through a preset right region 603 of the light-emitting module 120. According to one embodiment, when the helmet device 100 detects an approach of an object in each of at least two regions among the first region 501, the second region 502, and the third region 503 of the image 500, the helmet device 100 may emit light through an entire region of the light-emitting module 120 in order to more clearly warn the user of the approach of the object in various directions. For example, referring to FIGS. 5C and 6B, when the helmet device 100 detects the approach of the first object in the first region 501 and the approach of the second object in the second region 502, the helmet device 100 may control the light-emitting module 120 to emit light through an entire region 604 of the light-emitting module 120.

According to one embodiment, when vibration data measured by the personal mobility device 200 is received from the personal mobility device 200 through the communication module 110, in response to an approach of an external object in a state in which the vibration data is a first preset value or less, the helmet device 100 may generate a first vibration pattern having first vibration intensity through the vibration module 160. In addition, in response to an approach of an external object in a state in which the vibration data exceeds the first set value, the helmet device 100 may generate the first vibration pattern having second vibration intensity greater than the first vibration intensity through the vibration module 160. According to one embodiment, in a state in which a notification providing method is set to a first method of providing a notification through the vibration module 160, when the vibration data measured by the personal mobility device 200 exceeds a second preset value greater than the first second value, the helmet device 100 may change the notification providing method from the first method to a second method of providing a notification through the speaker module 150 and the light-emitting module 120. In this case, in a state in which the helmet device 100 is set to provide a notification in the second method, the vibration module 160 may be deactivated.

Figure 7:
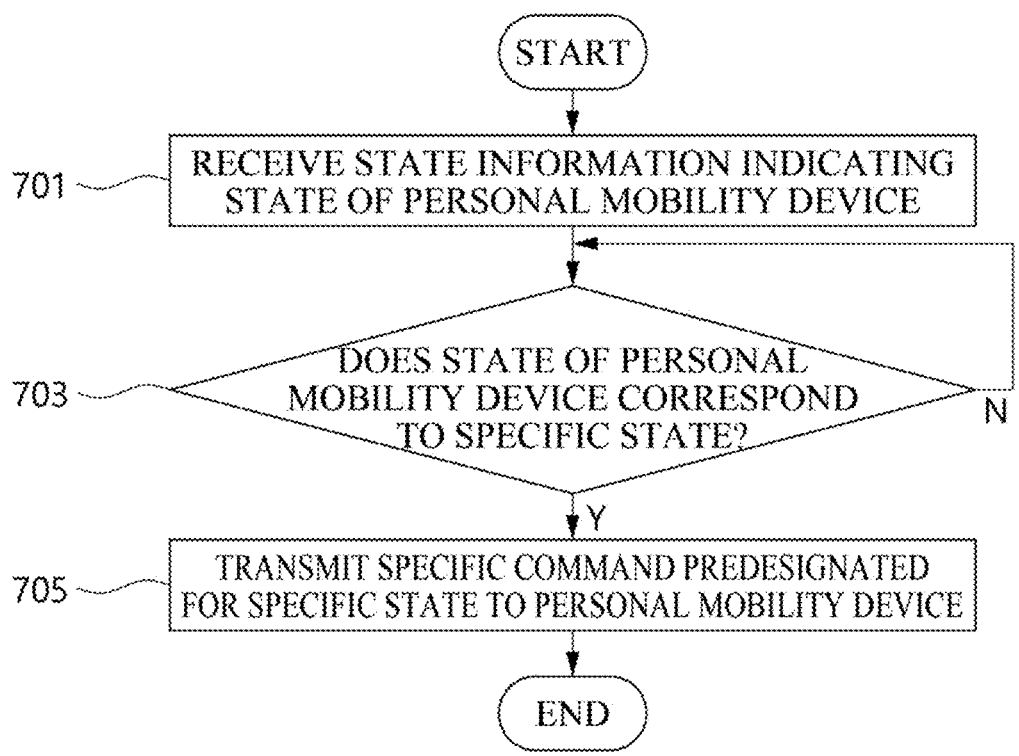
FIG. 7 is a flowchart illustrating an operation in which a helmet device controls a personal mobility device according to various embodiments.

FIG. 7 is a flowchart illustrating an operation in which a helmet device (for example, the helmet device 100 of FIG. 2) controls a personal mobility device (for example, the personal mobility device 200 of FIG. 2) according to various embodiments.

According to various embodiments, in operation 701, the helmet device 100 (for example, the processor 170 of FIG. 2) may receive state information indicating a state of the personal mobility device 200 from the personal mobility device 200 through a communication module (for example, the communication module 110 of FIG. 2). According to one embodiment, in addition to information about an operation permission state or an operation-disable state that is state information 517 of FIG. 5A, the state information of the personal mobility device 200 may include state information acquired through a sensor module included in the personal mobility device 200 (for example, the sensor module 230 of FIG. 2). For example, in order to identify a weight of a user who rides the personal mobility device 200, the helmet device 100 may receive weight data of the user measured through a pressure sensor of the personal mobility device 200 as the state information. For another example, in order to identify a current tilt state of the personal mobility device 200, the helmet device 100 may receive tilt information of the personal mobility device 200 measured through at least one of an acceleration sensor, a gyro sensor, and a geomagnetic sensor of the personal mobility device 200 as the state information.

According to various embodiments, in operation 703, the helmet device 100 (for example, the processor 170 of FIG. 2) may determine whether the state of the personal mobility device 200 corresponds to a specific state based on the state information.

According to one embodiment, the helmet device 100 may determine whether the weight data of the user received from the personal mobility device 200 exceeds a preset value. When the weight data exceeds the preset value, the helmet device 100 may determine that the state of the personal mobility device 200 corresponds to the specific state. When the weight data of the user received from the personal mobility device 200 exceeds a preset value corresponding to a weight of two people (for example, 110 kg), the helmet device 100 may determine that the state of the personal mobility device 200 is an overcapacity state.

According to one embodiment, in a state in which the personal mobility device 200 is in operation, the helmet device 100 may determine whether tilt information of the personal mobility device 200 received from the personal mobility device 200 corresponds to a preset tilt state. When the tilt information corresponds to the preset tilt state, the helmet device 100 may determine that the state of the personal mobility device 200 corresponds to the specific state. When a tilt state (or posture state) of the personal mobility device 200 received from the personal mobility device 200 corresponds to a preset tilt state corresponding to a state of being tilted at a certain angle or more, the helmet device 100 may determine that the personal mobility device 200 is in an abnormal operation state.

According to various embodiments, in operation 705, when the state of the personal mobility device 200 corresponds to the specific state, the helmet device 100 may transmit a preset specific command for the specific state to the personal mobility device 200 through the communication module 110.

According to one embodiment, when the weight data of the user received from the personal mobility device 200 exceeds the preset value, the helmet device 100 may transmit a specific command for outputting a notification using a speaker module (for example, the speaker module 250 of FIG. 2) of the personal mobility device 200 to the personal mobility device 200 through the communication module 110.

According to one embodiment, in a state in which the personal mobility device 200 is in operation, when the tilt state of the personal mobility device 200 received from the personal mobility device 200 corresponds to the preset tilt state, the helmet device 100 may transmit a specific command for gradually decreasing a speed of the personal mobility device 200 to the personal mobility device 200 through the communication module 110.

Figure 8:
FIG. 8 shows images for describing an example in which a helmet device controls a personal mobility device based on a type of a road or a condition of a road according to various embodiments.
Figure 8:
Figure 8:
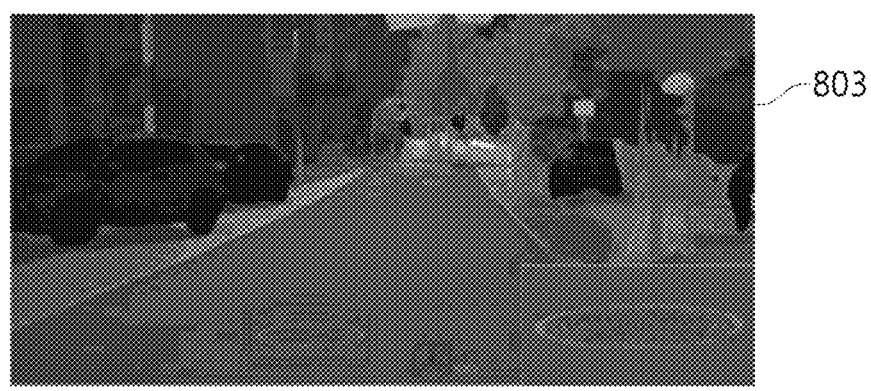

FIG. 8 shows images for describing an example in which a helmet device (for example, the helmet device 100 of FIG. 2) controls a personal mobility device (for example the personal mobility device 200 of FIG. 2) based on a type of a road or a condition of a road according to various embodiments.

According to various embodiments, the helmet device 100 (for example, the processor 170 of FIG. 2) may determine at least one of a type of a road and a condition of the road, on which the personal mobility device 200 interworking with the helmet device 100 travels, from an image acquired through a camera module (for example, the camera module 140 of FIG. 2) using a deep learning-based semantic segmentation model.

According to one embodiment, the helmet device 100 may determine the type of the road on which the personal mobility device 200 travels based on the acquired image using the deep learning-based semantic segmentation model. For example, referring to numerical number 801 of FIG. 8, the helmet device 100 may determine that the type of the road on which the personal mobility device 200 travels is a roadway by applying the acquired image to the semantic segmentation model. For another example, referring to numerical number 802 of FIG. 8, the helmet device 100 may determine that the type of road on which the personal mobility device 200 travels is a sidewalk by applying the acquired image to the semantic segmentation model. The type of the road described above is merely one example. A type of a road that can be determined through the semantic segmentation model is not limited thereto, and the semantic segmentation model can be trained to distinguish various types of roads (for example, a roadway, a sidewalk, a bicycle road, and a crosswalk).

According to one embodiment, the helmet device 100 may determine the condition of the road on which the personal mobility device 200 travels based on the acquired image using the deep learning-based semantic segmentation model. For example, referring to numerical number 803 of in FIG. 8, the helmet device 100 may determine that a condition of the road on which the personal mobility device 200 travels is a specific condition (for example, an icy road or a raining road) by applying the acquired image to the semantic segmentation model. The type of the road described above is merely one example. A type of a road that can be determined through the semantic segmentation model is not limited thereto, and the semantic segmentation model can be trained to distinguish various types of roads (for example, an icy road, a raining road, a snowy road, a paved road, and an unpaved road).

According to various embodiments, the helmet device 100 (for example, the processor 170 of FIG. 2) may control a maximum speed that can be output from the personal mobility device 200 or provide a notification through the helmet device 100 based on at least one of the type of the road or the condition of the road on which the personal mobility device 200 travels.

According to one embodiment, when the determined type of the road is a first type (for example, a crosswalk) or the determined condition of the road is a first condition (for example, a raining road), the helmet device 100 may transmit a command, which is for reducing the maximum speed that can be output from the personal mobility device 200 from a preset first speed to a second speed, to the personal mobility device 200 through a communication module 110.

According to one embodiment, when the determined type of the road is a second type (for example, a roadway) or the determined condition of the road is a second condition (for example, a snowy road), the helmet device 100 may output a warning sound through a speaker module (for example, the speaker module 150 of FIG. 2) or emit light through a light-emitting module (for example, the light-emitting module 120 of FIG. 2) as a notification to warn the user.

[Paraphrasing of Claims]

According to various embodiments, a helmet device includes a communication module, a sensor module, a camera module, and a processor. The processor may be set to determine whether a user wears the helmet device using the sensor module, when the user wears the helmet device, transmit a first transmission signal indicating that the user wears the helmet device to a user device interworking with the helmet device through the communication module, when a first response signal for the first transmission signal is received from the user device through the communication module, activate the camera module and determine whether an external object approaches based on an image acquired through the camera module, and in response to the approach of the object, provide a notification to the user.

According to various embodiments, the sensor module may include a heat sensor, a pressure sensor, or a proximity sensor, and based on a sensor value that is measured by the sensor module and exceeds a preset value for a preset time, the processor may be set to determine that the user wears the helmet device.

According to various embodiments, the processor may be set to recognize the object from the image acquired through the camera module using a deep learning-based object recognition algorithm, estimate a distance between the helmet device and the object using a deep learning-based depth estimation algorithm, and determine that the object approaches when the estimated distance to the object is within a preset distance.

According to various embodiments, the processor may be set to recognize the object in a region except for a central region corresponding to a preset range from a central point of the image in an entire region of the image.

According to various embodiments, the helmet device may further include a speaker module, a vibration module, and a light-emitting module. In response to the approach of the object, the processor may be set to perform at least one of operation 1 of controlling the light-emitting module to emit light, operation 2 of controlling the speaker module to output a sound, and operation 3 of controlling the vibration module to generate vibrations.

According to various embodiments, the image may be divided into a first region for detecting an approach of a first object in a photographing direction of the camera module, a second region for detecting an approach of a second object in a rear-left direction of the photographing direction, and a third region for detecting an approach of a third object in a rear-right direction of the photographing, and the helmet device may further include a first mirror spaced a first distance from the camera module and tilted at a first angle with respect to the camera module to display the second region and a second mirror spaced a second distance from the camera module and tilted at a second angle with respect to the camera module to display the third region.

According to various embodiments, the processor may be set to, when the approach of the first object is detected only in the first region among the first region, the second region, and the third region of the image, control the light-emitting module to emit light onto a central region of the light-emitting module, when the approach of the second object is detected only in the second region, control the light-emitting module to emit light onto a left region of the light-emitting module, when the approach of the third object is detected only in the third region, control the light-emitting module to emit light onto a right region of the light-emitting module, and when an approach of objects is detected in each of at least two regions of the image, control the light-emitting module to emit light onto an entire region of the light-emitting module.

According to various embodiments, the processor may be set to receive vibration data measured by a personal mobility device from the personal mobility device interworking with the helmet device through the communication module, control the vibration module to generate a first vibration pattern having first vibration intensity in response to the approach of the object in a state in which the vibration data is less than or equal to a first preset value, and control the vibration module to generate the first vibration pattern having second vibration intensity greater than the first vibration intensity in response to the approach of the object in a state in which the vibration data exceeds the first preset value.

According to various embodiments, in a state in which a notification providing method is set to a first method of providing the notification through the vibration module, when the vibration data exceeds a second preset value greater than the first preset value, the processor may be set to change the notification providing method from the first method to a second method of providing the notification through the speaker module and the light-emitting module.

According to various embodiments, the processor may receive weight data measured by a personal mobility device from the personal mobility device through the communication module, and when the weight data exceeds a preset value, the processor may be set to transmit a command for outputting a notification using a speaker module of the personal mobility device to the personal mobility device through the communication module.

According to various embodiments, the processor may receive tilt information of a personal mobility device from the personal mobility device through the communication module, and when it is determined that a tilt state of the personal mobility device corresponds to a preset tilt state based on the tilt information in a state in which the personal mobility device is in operation, the processor may be set to transmit a command for gradually decreasing a speed of the personal mobility device to the personal mobility device through the communication module.

According to various embodiments, the processor may be set to determine at least one of a type of a road and a condition of the road on which a personal mobility device interworking with the helmet device travels from the image using a deep learning-based semantic segmentation model, when the determined type of the road is a first type (crosswalk) or the determined condition of the road is a first condition, transmit a command for decreasing a maximum speed output from the personal mobility device from a preset first speed to a second speed to the personal mobility device through the communication module, and when the determined type of the road is a second type (roadway) or the determined condition of the road is a second condition, provide a first notification.

According to various embodiments, a method of operating a helmet device includes determining whether a user wears the helmet device using a sensor module of the helmet device, when the user wears the helmet device, transmitting a first transmission signal indicating that the user wears the helmet device to a user device interworking with the helmet device through a communication module of the helmet device, when a first response signal for the first transmission signal is received from the user device through the communication module, activating a camera module of the helmet device and then determining whether an external object approaches based on an image acquired through the camera module, and in response to the approach of the object, providing a notification to the user.

According to various embodiments, the sensor module may include a heat sensor, a pressure sensor, or a proximity sensor, and the determining of whether the user wears the helmet device may include determining whether the user wears the helmet device based on a sensor value that is measured by the sensor module and exceeds a preset value for a preset time.

According to various embodiments, the determining of whether the object approaches may include recognizing the object from the image acquired through the camera module using a deep learning-based object recognition algorithm, estimating a distance between the helmet device and the object using a deep learning-based depth estimation algorithm, and determining that the object approaches when the estimated distance to the object is within a preset distance.

According to various embodiments, the recognizing of the object may include recognizing the object in a region except for a central region corresponding to a preset range from a central point of the image in an entire region of the image.

According to various embodiments, the providing of the notification may include, in response to the approach of the object, performing at least one of operation 1 of controlling a light-emitting module to emit light, operation 2 of controlling a speaker module to output a sound, and operation 3 of controlling a vibration module to generate vibrations.

The providing of the notification may include, when an approach of a first object is detected only in a first region among the first region, a second region, and a third region of the image, controlling the light-emitting module to emit light onto a central region of the light-emitting module, when an approach of a second object is detected only in the second region, controlling the light-emitting module to emit light onto a left region of the light-emitting module, when an approach of a third object is detected only in the third region, controlling the light-emitting module to emit light onto a right region of the light-emitting module, and when an approach of objects in each of at least two regions of the image, controlling the light-emitting module to emit light onto an entire region of the light-emitting module.

According to various embodiments, the providing of the notification may include receiving vibration data measured by a personal mobility device from the personal mobility device interworking with the helmet device through the communication module, controlling the vibration module to generate a first vibration pattern having first vibration intensity in response to the approach of the object in a state in which the vibration data is less than or equal to a first preset value, and controlling the vibration module to generate the first vibration pattern having second vibration intensity greater than the first vibration intensity in response to the approach of the object in a state in which the vibration data exceeds the first preset value. According to various embodiments of the present invention, a processor can identify an object approaching a helmet through an image captured by a camera module, and when the processor determines through the image that the object has approached, an alarm can be displayed such that a user easily recognizes the object, thereby providing a solution capable of protecting the user from the object approaching the helmet.

In addition, according to various embodiments of the present invention, a processor of a helmet checks a type and condition of a road on which a personal mobility devices travels from an image captured by a camera module using a semantic segmentation model, and as a result in which the processor checks any change, when the condition of the road is determined to be abnormal, a notification is provided in an alarm method different from an object alarm, thereby providing a solution that allows the user to control the personal mobility device by recognizing the condition of the road.

Furthermore, according to various embodiments of the present invention, by using information of a sensor module of a personal mobility device interworking with a communication device, a processor of a helmet checks a weight of a user who boards the personal mobility device, a tilt of the personal mobility device, and vibrations of the personal mobility device, and when the processor determines that the personal mobility device is not in a normal state through the information, an alarm is displayed such that the user easily recognizes the alarm, thereby providing a solution to prevent a failure of the personal mobility device.

[Acknowledgement]

This results were supported by "Regional Innovation Strategy (RIS)" through the National Research Foundation of Korea (NRF) funded by the Ministry of Education (MOE) (2021RIS-004).

What is claimed is:

1. A helmet device comprising:
a communication interface;
one or more sensors;
a camera; and
one or more processors,
wherein the one or more processors is configured to:
  determine whether a user wears the helmet device using the one or more sensors;
  in response that the user wears the helmet device, transmit a first transmission signal indicating that the user wears the helmet device to a user device interworking with the helmet device through the communication interface;
  in response to receiving a first response signal for the first transmission signal from the user device through the communication interface, activate the camera and then determine whether an object approaches from an outside based on an image acquired through the camera;
  in response to the approach of the object, provide a notification to the user;
wherein the helmet device interworks with a personal mobility device, and an operation permission of the personal mobility device is determined based on the first transmission signal.

2. The helmet device of claim 1, wherein:
the one or more sensors include a heat sensor, a pressure sensor, or a proximity sensor; and
based on a sensor value that is measured by the one or more sensors and exceeds a preset value for a preset time, the one or more processors is configured to determine that the user wears the helmet device.

3. The helmet device of claim 1, wherein the one or more processors is configured to:
recognize the object from the image acquired through the camera using a deep learning-based object recognition algorithm;
estimate a distance between the helmet device and the object using a deep learning-based depth estimation algorithm; and
determine that the object approaches when the estimated distance to the object is within a preset distance.

4. The helmet device of claim 3, wherein the one or more processors is configured to recognize the object in a region except for a central region corresponding to a preset range from a central point of the image in an entire region of the image.

5. The helmet device of claim 1, further comprising:
a speaker module;
a vibration module; and
a light-emitting module,
wherein, in response to the approach of the object, the one or more processors is configured to perform at least one of:
controlling the light-emitting module to emit light;
controlling the speaker module to output a sound; and
controlling the vibration module to generate vibrations.

6. The helmet device of claim 1, wherein:
the image is divided into a first region for detecting an approach of a first object in a photographing direction of the camera, a second region for detecting an approach of a second object in a rear-left direction of the photographing direction, and a third region for detecting an approach of a third object in a rear-right direction of photographing; and
the helmet device further includes a first mirror spaced a first distance from the camera and tilted at a first angle with respect to the camera to display the second region and a second mirror spaced a second distance from the camera module and tilted at a second angle with respect to the camera to display the third region.

7. The helmet device of claim 6, wherein the one or more processors is configured to:
when the approach of the first object is detected only in the first region among the first region, the second region, and the third region of the image, control the light-emitting module to emit light onto a central region of the light-emitting module, when the approach of the second object is detected only in the second region, control the light-emitting module to emit light onto a left region of the light-emitting module, when the approach of the third object is detected only in the third region, control the light-emitting module to emit light onto a right region of the light-emitting module, and when an approach of objects is detected in each of at least two regions of the image, control the light-emitting module to emit light onto an entire region of the light-emitting module.

8. The helmet device of claim 5, wherein the one or more processors is configured to:

receive vibration data measured by a personal mobility device from the personal mobility device interworking with the helmet device through the communication interface, control the vibration module to generate a first vibration pattern having first vibration intensity in response to the approach of the object in a state in which the vibration data is a first preset value or less, and control the vibration module to generate the first vibration pattern having second vibration intensity greater than the first vibration intensity in response to the approach of the object in a state in which the vibration data exceeds the first preset value.

9. The helmet device of claim 8, wherein, in a state in which a notification providing method is set to a first method of providing the notification through the vibration module, when the vibration data exceeds a second preset value greater than the first preset value, the one or more processors is configured to change the notification providing method from the first method to a second method of providing the notification through the speaker module and the light-emitting module, and the vibration module is deactivated in the second method.

10. The helmet device of claim 1, wherein the one or more processors is configured to:

receive weight data measured by a personal mobility device from the personal mobility device through the communication interface; and when the weight data exceeds a preset value, transmit a command for outputting a notification using a speaker module of the personal mobility device to the personal mobility device through the communication interface.

11. The helmet device of claim 1, wherein the one or more processors is configured to:

receive tilt information of a personal mobility device from the personal mobility device through the communication interface; and when it is determined that a tilt state of the personal mobility device corresponds to a preset tilt state based on the tilt information in a state in which the personal mobility device is in operation, transmit a command for gradually decreasing a speed of the personal mobility device to the personal mobility device through the communication interface.

12. The helmet device of claim 1, wherein the one or more processors is configured to:

determine at least one of a type of a road and a condition of the road on which a personal mobility device interworking with the helmet device travels from the image using a deep learning-based semantic segmentation model;

when the determined type of the road is a first type (crosswalk) or the determined condition of the road is a first condition, transmit a command for decreasing a maximum speed output from the personal mobility device from a preset first speed to a second speed to the personal mobility device through the communication interface; and when the determined type of the road is a second type (roadway) or the determined condition of the road is a second condition, provide a first notification.

13. A method of operating a helmet device, the method comprising:

determining whether a user wears the helmet device using one or more sensors of the helmet device;

in response that the user wears the helmet device, transmitting a first transmission signal indicating that the user wears the helmet device to a user device interworking with the helmet device through a communication interface of the helmet device;

in response to receiving a first response signal for the first transmission signal from the user device through the communication interface, activating a camera of the helmet device and then determining whether an object approaches from an outside based on an image acquired through the camera;

in response to the approach of the object, providing a notification to the user, and wherein the helmet device interworks with a personal mobility device, and an operation permission of the personal mobility device is determined based on the first transmission signal.

14. The method of claim 13, wherein:

the one or more sensors include a heat sensor, a pressure sensor, or a proximity sensor; and the determining of whether the user wears the helmet device includes determining whether the user wears the helmet device based on a sensor value that is measured by the one or more sensors and exceeds a preset value for a preset time.

15. The method of claim 13, wherein the determining of whether the object approaches includes:

recognizing the object from the image acquired through the camera using a deep learning-based object recognition algorithm;

estimating a distance between the helmet device and the object using a deep learning-based depth estimation algorithm; and determining that the object approaches when the estimated distance to the object is within a preset distance.

16. The method of claim 15, wherein the recognizing of the object includes recognizing the object in a region except for a central region corresponding to a preset range from a central point of the image in an entire region of the image.

17. The method of claim 13, wherein:

the helmet device further includes a speaker module, a vibration module, and a light-emitting module; and the providing of the notification includes, in response to the approach of the object, performing at least one of:

controlling the light-emitting module to emit light;

controlling the speaker module to output a sound; and controlling the vibration module to generate vibrations.

18. The method of claim 13, wherein:

the image is divided into a first region for detecting an approach of a first object in a photographing direction of the camera, a second region for detecting an approach of a second object in a rear-left direction of the photographing direction, and a third region for detecting an approach of a third object in a rear-right direction of photographing; and the helmet device further includes a first mirror spaced a first distance from the camera and tilted at a first angle with respect to the camera to display the second region and a second mirror spaced a second distance from the camera and tilted at a second angle with respect to the camera to display the third region.

19. The method of claim 18, wherein the providing of the notification includes:

when the approach of the first object is detected only in the first region among the first region, the second region, and the third region of the image, controlling the light-emitting module to emit light onto a central region of the light-emitting module;

when the approach of the second object is detected only in the second region, controlling the light-emitting module to emit light onto a left region of the light-emitting module;

when the approach of the third object is detected only in the third region, controlling the light-emitting module to emit light onto a right region of the light-emitting module; and when an approach of objects is detected in each of at least two regions of the image, controlling the light-emitting module to emit light onto an entire region of the light-emitting module.

20. The method of claim 17, wherein the providing of the notification includes:

receiving vibration data measured by a personal mobility device from the personal mobility device interworking with the helmet device through the communication interface;

controlling the vibration module to generate a first vibration pattern having first vibration intensity in response to the approach of the object in a state in which the vibration data is a first preset value or less; and controlling the vibration module to generate the first vibration pattern having second vibration intensity greater than the first vibration intensity in response to the approach of the object in a state in which the vibration data exceeds the first preset value.

* * * * *